(12) United States Patent
Kim (10) Patent No.: US 12,337,808 B2
(45) Date of Patent: Jun. 24, 2025

(54) APPARATUS, METHOD AND COMPUTER READABLE STORAGE MEDIUM FOR UPDATING PRE-STORED SETTING VALUE FOR CONTROLLING BOOST POWER OF ELECTRIC BOOSTER

(71) Applicants: HYUNDAI MOTOR COMPANY, Seoul (KR); KIA CORPORATION, Seoul (KR)

(72) Inventor: Jae Young Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 162 days.

(21) Appl. No.: 18/201,297

(22) Filed: May 24, 2023

(65) Prior Publication Data

US 2024/0246523 A1    Jul. 25, 2024

(30) Foreign Application Priority Data

Jan. 20, 2023 (KR) .......................... 10-2023-0008957

(51) Int. Cl.
*B60T 17/22* (2006.01)
*B60T 8/32* (2006.01)

(52) U.S. Cl.
CPC ............ *B60T 17/22* (2013.01); *B60T 8/3265* (2013.01); *B60T 2220/04* (2013.01);
(Continued)

(58) Field of Classification Search
CPC .... B60T 17/22; B60T 8/3265; B60T 2220/04; B60T 2250/00; B60T 2270/406;
(Continued)

(56) References Cited

U.S. PATENT DOCUMENTS

2013/0197771 A1*   8/2013   Takeda .................. B60T 13/745
                                                            701/70
2018/0370515 A1*  12/2018   Kim ...................... B60T 8/4072
(Continued)

FOREIGN PATENT DOCUMENTS

CN          1231638 A  * 10/1999  ............ B60T 13/168
JP     2009227230 A  * 10/2009
(Continued)

*Primary Examiner* — Hung Q Nguyen
(74) *Attorney, Agent, or Firm* — Morgan, Lewis & Bockius LLP (57) ABSTRACT

An apparatus for updating a pre-stored setting value for controlling boost power of an electric booster, includes: a control unit including a processor; and a storage medium recording one or more programs configured to be executable by the processor, the one or more programs including instructions; and a measuring unit of measuring braking characteristics including pedal stroke, deceleration, and hydraulic pressure applied from the electric booster to a braking unit during braking through a braking test of a vehicle, wherein the control unit is configured for updating the pre-stored setting value so that the deceleration includes desired target deceleration based on the measured braking characteristics, and wherein the pre-stored setting value may be proportional to the pedal stroke, and may be a value for setting a magnitude of the hydraulic pressure.

20 Claims, 5 Drawing Sheets

(52) U.S. Cl.
CPC ..... *B60T 2250/00* (2013.01); *B60T 2270/406* (2013.01); *B60T 2270/82* (2013.01); *B60T 2270/88* (2013.01)

(58) Field of Classification Search
CPC ............ B60T 2270/82; B60T 2270/88; B60T 13/662; B60T 13/745; B60T 8/172; B60T 8/171; B60T 8/40; B60T 13/66; B60T 17/221; B60Y 2400/81
USPC .......................................................... 701/70
See application file for complete search history.

(56) References Cited

U.S. PATENT DOCUMENTS

2020/0216051 A1* 7/2020 Mannherz ............... B60T 13/66
2020/0324744 A1 10/2020 Mizusaki et al.

FOREIGN PATENT DOCUMENTS

KR         20120046013 A * 5/2012 ............ B60T 13/745
KR    10-2020-0074202 A     6/2020

* cited by examiner

APPARATUS, METHOD AND COMPUTER READABLE STORAGE MEDIUM FOR UPDATING PRE-STORED SETTING VALUE FOR CONTROLLING BOOST POWER OF ELECTRIC BOOSTER

CROSS-REFERENCE TO RELATED APPLICATION(S)

The present application claims priority to Korean Patent Application No. 10-2023-0008957 filed on Jan. 20, 2023, the entire contents of which is incorporated herein for all purposes by this reference.

BACKGROUND OF THE PRESENT DISCLOSURE

Field of the Present Disclosure

The present application relates to an apparatus, method, and computer-readable storage medium for updating a pre-stored setting value for controlling boost power of an electric booster.

Description of Related Art

In general, a braking device of a vehicle is a booster provided between a brake pedal and a master cylinder, for increasing pedal operation force (i.e., pedal effort) which is force applied to the brake pedal by a driver, and for transmitting the force to the master cylinder, that is, a brake booster reduces force required when the driver operates the brake pedal.

Meanwhile, an electric booster using an electric motor is known as a booster reducing force required when operating a brake pedal.

Such an electric booster is an electrical device using power of an electric motor rather than negative pressure of a mechanical engine to increase power, and when the operation of the electric motor is controlled based on an amount of the brake pedal operation detected by a sensor (i.e., pedal stroke), rotation motion of the electric motor advances a piston so that a required amount of hydraulic pressure may be generated in the master cylinder.

Conventionally, the hydraulic pressure according to the amount of pedal operation was manually set. That is, the hydraulic pressure to be applied to the electric booster was set by measuring a response of the vehicle, for example, deceleration, according to the amount of pedal operation, and continuously changing the amount of pedal operation until the desired degree of deceleration was achieved, but there was a problem in that the present process takes a lot of time.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus, method, and computer-readable storage medium for updating a pre-stored setting value for controlling boost power of an electric booster, which can reduce an amount of time required to update the setting value.

According to an aspect of the present disclosure, provided is an apparatus for updating a pre-stored setting value for controlling boost power of an electric booster, the apparatus including: a control unit including a processor: and a storage medium recording one or more programs configured to be executable by the processor, the one or more programs including instructions: and a measuring unit of measuring braking characteristics including pedal stroke, deceleration, and hydraulic pressure applied from the electric booster to a braking unit during braking through a braking test of a vehicle: and wherein the control unit is configured for updating the pre-stored setting value so that the deceleration includes desired target deceleration based on the measured braking characteristics, and wherein the pre-stored setting value is proportional to the pedal stroke, and is a value for setting a magnitude of the hydraulic pressure.

According to an aspect of the present disclosure, provided is a method for updating a pre-stored setting value for controlling boost power of an electric booster, the method including: a first step of measuring braking characteristics including pedal stroke, deceleration, and hydraulic pressure applied from the electric booster to a braking unit during braking through a braking test of a vehicle: and a second step of updating the pre-stored setting value so that the deceleration includes desired target deceleration based on the measured braking characteristics, wherein the pre-stored setting value is proportional to the pedal stroke and is a value for setting a magnitude of the hydraulic pressure.

According to an aspect of the present disclosure, provided is a computer-readable storage medium in which a program for executing the method by a computer is recorded.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments in an exemplary embodiment of the present disclosure will be described with reference to the accompanying drawings. The present disclosure may, however, be exemplified in many different forms and should not be construed as being limited to the specific embodiments set forth herein. Rather, these embodiments are provided so that the present disclosure will be thorough and complete, and will fully convey the scope of the present disclosure to those skilled in the art. In the drawings, the same reference numerals will be used throughout to designate the same or like elements, and the shapes and dimensions of elements may be exaggerated for clarity, and elements indicated by the same reference numerals in the drawings are the same elements.

Figure 1:
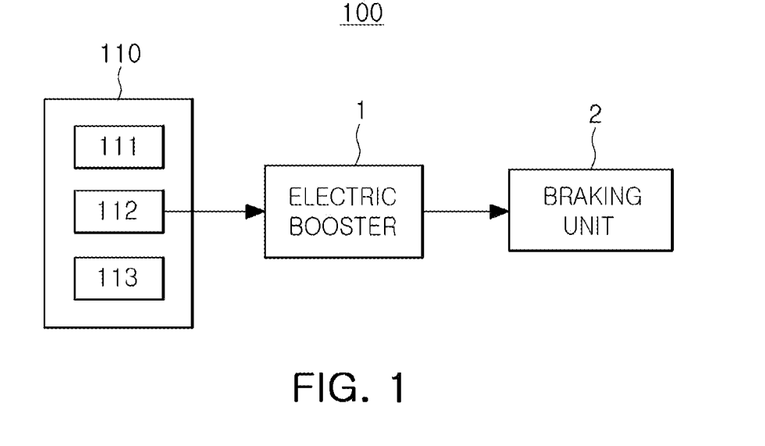
FIG. 1 is a system including an apparatus for updating a pre-stored setting value for controlling boost power of an electric booster according to an exemplary embodiment of the present disclosure of the present disclosure.

FIG. 1 is a system including an apparatus for updating a pre-stored setting value for controlling boost power of an electric booster according to an exemplary embodiment of the present disclosure. First as illustrated in FIG. 1, a system 100 may include an apparatus for updating a pre-stored setting value 110, an electric booster 1, and a braking unit 2.

First of all, the electric booster 1 is an electrical device using power of an electric motor rather than mechanical engine negative pressure to increase power. When receiving a setting value for controlling boost power from the apparatus for updating a pre-stored setting value 110, the electric booster 1 may be configured to generate hydraulic pressure according to the setting value in a master cylinder by controlling an operation of the electric motor to advance a piston. The generated hydraulic pressure may be applied to the braking unit 2.

The braking unit 2 may be a module for braking a brake disk. The braking unit 2 may brake a vehicle by pressing a pad to the brake disc by hydraulic pressure applied from the electric booster 1. The braking unit 2 may include a known structure such as a brake disc, a caliper, or a pad.

Meanwhile, the apparatus for updating a pre-stored setting value 110 may update a pre-stored setting value for controlling boost power of an electric booster. In an exemplary embodiment of the present disclosure, boost power refers to power of an electric booster for increasing braking force of a vehicle. The pre-stored setting value for controlling boost power is proportional to a pedal stroke (PS) and may be a value for setting a magnitude of hydraulic pressure, and may be pre-stored in a storage unit 113 to be described later.

The apparatus for updating a pre-stored setting value 110 may include a measuring unit 111, a control unit 112, and a storage unit 113.

The measuring unit 111 may measure braking characteristics including a pedal stroke, pedal effort, deceleration, and hydraulic pressure during braking through a braking test of a vehicle based on a pre-stored setting value. Here, the hydraulic pressure may be applied from the electric power booster 1 to the braking unit 2. The pedal stroke may be measured using a displacement sensor, the pedal effort may be measured using a pressure sensor, the deceleration may be measured using an acceleration sensor, and the hydraulic pressure may be measured using a hydraulic pressure sensor. The measured braking characteristics may be transmitted to the control unit 112 to be described later.

Meanwhile, the control unit 112 may update a pre-stored setting value so that the deceleration has desired target deceleration based on the measured braking characteristics.

Hereinafter, a process of updating a pre-stored setting value for controlling boost power of an electric booster will be described in a first exemplary embodiment and a second exemplary embodiment.

1. First Exemplary Embodiment

Figure 2A:
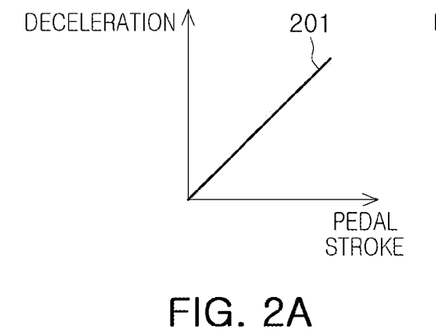
FIG. 2A and FIG. 2B are diagrams illustrating a first correlation and a second correlation according to a first exemplary embodiment of the present disclosure.
Figure 2B:
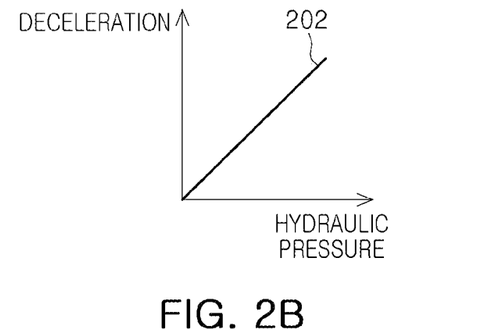
Figure 3A:
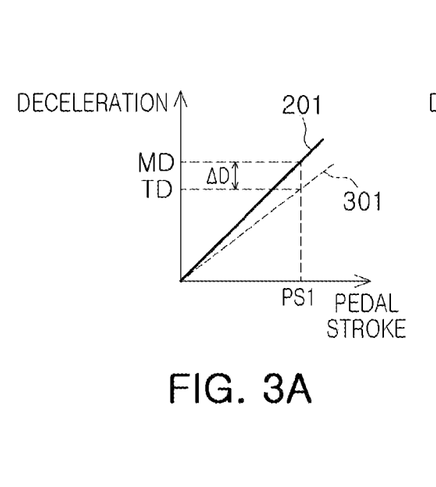
FIG. 3A and FIG. 3B are diagrams for illustrating a process for updating a pre-stored setting value based on a first correlation and a second correlation according to a first exemplary embodiment of the present disclosure.
Figure 3B:
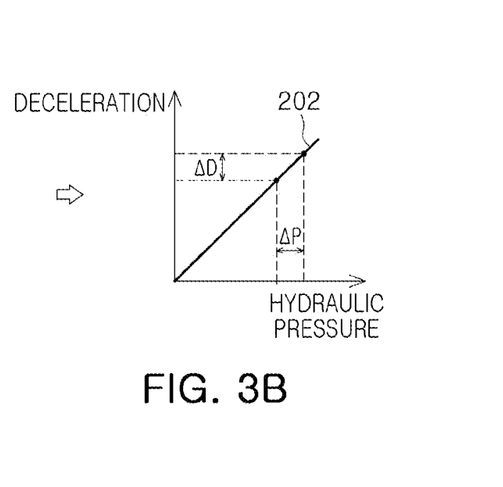

FIG. 2A and FIG. 2B are diagrams illustrating a first correlation and a second correlation according to a first exemplary embodiment of the present disclosure. FIG. 3A and FIG. 3B are diagrams for illustrating a process for updating a pre-stored setting value based on the first correlation and the second correlation according to the first exemplary embodiment of the present disclosure.

According to the first exemplary embodiment of the present disclosure, the control unit 112 may extract a first correlation 201 (see FIG. 2A) between a pedal stroke and deceleration, and a second correlation 202 (see FIG. 2B) between hydraulic pressure and deceleration based on braking characteristics measured by the measuring unit 111.

According to the first correlation 201 illustrated in FIG. 2A, the pedal stroke and the deceleration may include a proportional relationship.

Similarly, according to the second correlation 202 illustrated in FIG. 2B, the hydraulic pressure and the deceleration may include a proportional relationship.

Thereafter, the control unit 112 may update a pre-stored setting value based on the first correlation 201 and the second correlation 202.

As illustrated in FIG. 3A, the control unit 112 may obtain a difference in deceleration (ΔD) between deceleration MD and target deceleration TD at an arbitrary pedal stroke PS1 from the first correlation 201. In FIG. 3A, reference numeral 301 refers to target deceleration according to a pedal stroke, as described above.

Next, as illustrated in FIG. 3B, the control unit 112 may obtain a difference in hydraulic pressure (ΔP) corresponding to the difference in deceleration (ΔD) from the second correlation 202.

Finally, the control unit 112 may update a pre-stored setting value by adding the difference in hydraulic pressure (ΔP) to a magnitude of hydraulic pressure corresponding to the arbitrary pedal stroke P1.

The above-described process may be terminated by updating the pre-stored setting values for all pedal strokes.

2. Second Exemplary Embodiment

Figures 4A, 4B:
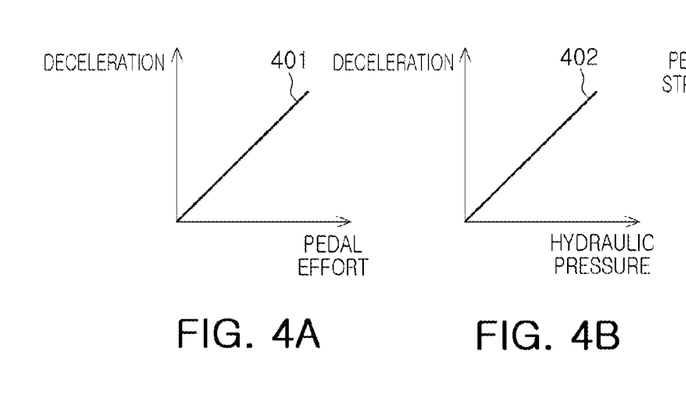
FIG. 4A, FIG. 4B and FIG. 4C are diagrams illustrating third to fifth correlations according to a second exemplary embodiment of the present disclosure.
Figure 4C:
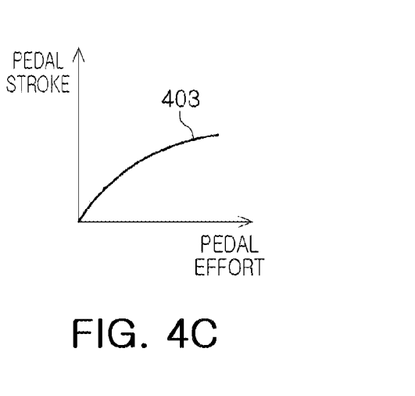
Figures 5A, 5B:
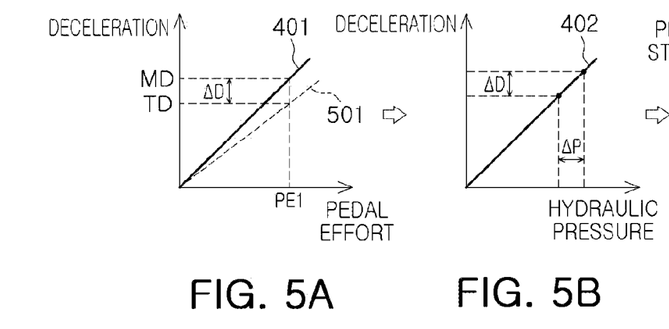
FIG. 5A, FIG. 5B, and FIG. 5C are diagrams for illustrating a process for updating a pre-stored setting value based on third to fifth correlations according to a second exemplary embodiment of the present disclosure.
Figure 5C:
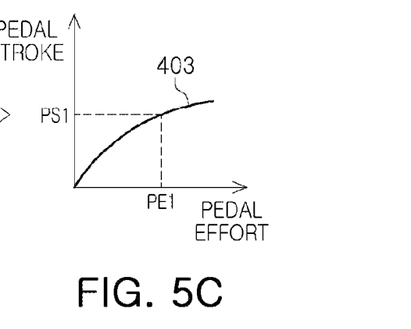

FIG. 4A, FIG. 4B and FIG. 4C are diagrams illustrating third to fifth correlations according to a second exemplary embodiment of the present disclosure. FIG. 5A, FIG. 5B, and FIG. 5C are diagrams for illustrating a process for updating a pre-stored setting value based on third to fifth correlations according to a second exemplary embodiment of the present disclosure.

According to the second exemplary embodiment of the present disclosure, the control unit 112 may extract a third correlation 401 (see (FIG. 4A) between a pedal effort and deceleration, a fourth correlation 402 (see FIG. 4B) between hydraulic pressure and deceleration, and a fifth correlation 403 (see FIG. 5C) between a pedal effort and a pedal stroke based on braking characteristics measured by the measuring unit 111.

According to the third correlation 401 illustrated in FIG. 4A, the pedal effort and deceleration may include a proportional relationship.

Similarly, according to the fourth correlation 402 illustrated in FIG. 4B, the hydraulic pressure and the deceleration may include a proportional relationship.

Meanwhile, according to the fifth correlation 403 illustrated in FIG. 4C, the pedal effort and the pedal stroke may include a quadratic function relationship in which a slope thereof gradually decreases.

Thereafter, the control unit 112 may update pre-stored setting value based on the third correlation 401, the fourth correlation 402, and the fifth correlation 403.

As illustrated in FIG. 5A, the control unit 112 may obtain a difference in deceleration (ΔD) between the deceleration MD and the target deceleration TD at an arbitrary pedal effort PEI from the third correlation 401. In FIG. 5A, reference numeral 501 refers to target deceleration according to a pedal effort.

Next, as illustrated in FIG. 5B, the control unit 112 may obtain a difference in hydraulic pressure (ΔP) corresponding to the difference in deceleration (ΔD) from the fourth correlation 402.

Thereafter, as illustrated in FIG. 5C, the control unit 112 may obtain a pedal stroke PS1 corresponding to an arbitrary pedal effort PEI from the fifth correlation 403, and update a pre-stored setting value by adding the difference in hydraulic pressure (ΔP) to a magnitude of hydraulic pressure corresponding to the pedal stroke PS1.

The above-described process may be terminated by updating pre-stored setting values for all pedal strokes.

Finally, the storage unit 113 may store a pre-stored setting value for controlling boost power described above in advance. Furthermore, the storage unit 113 may store in advance target deceleration 301 according to a pedal stroke and target deceleration 501 according to a pedal effort.

As described above, according to an exemplary embodiment of the present disclosure, the braking characteristics may be measured through a braking test of a vehicle based on a pre-stored setting value, and the pre-stored setting value may be updated so that deceleration has desired target deceleration based on the measured braking characteristics, so that an amount of time required to update the setting value may be reduced.

Figure 6:
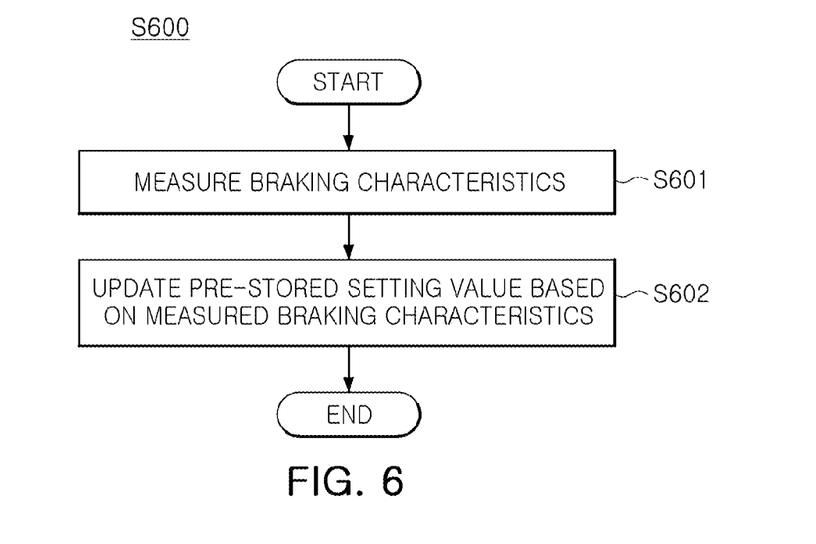
FIG. 6 is a flowchart illustrating a method for updating a pre-stored setting value for controlling boost power of an electric booster according to an exemplary embodiment of the present disclosure of the present disclosure.
Figure 7:
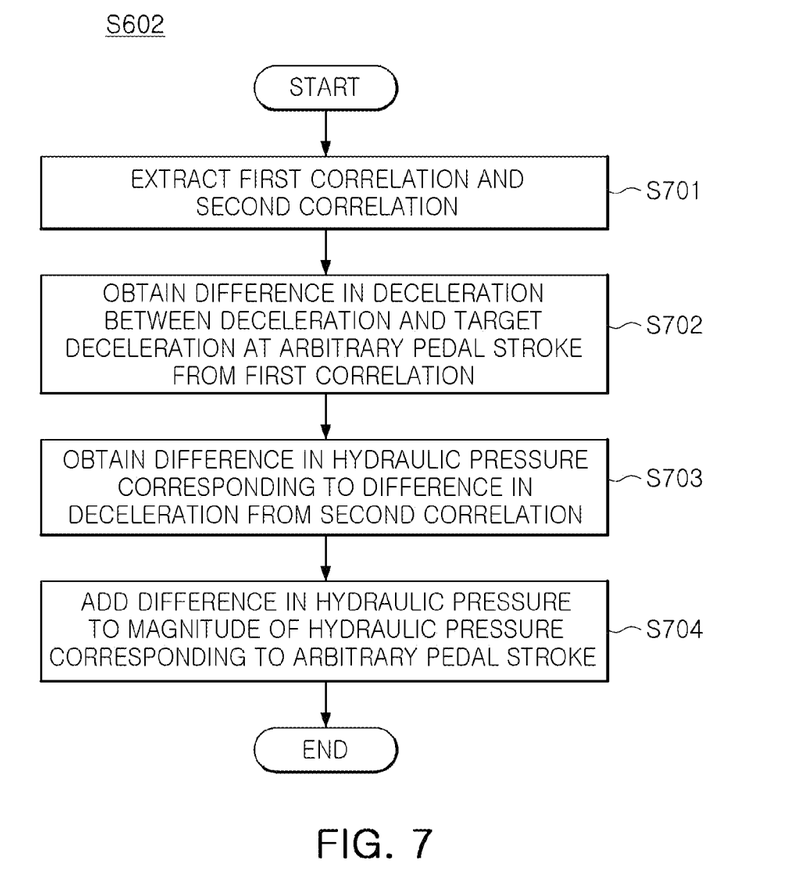
FIG. 7 is a flowchart for illustrating a method for embodying step S602 of FIG. 6 according to the first exemplary embodiment of the present disclosure.
Figure 8:
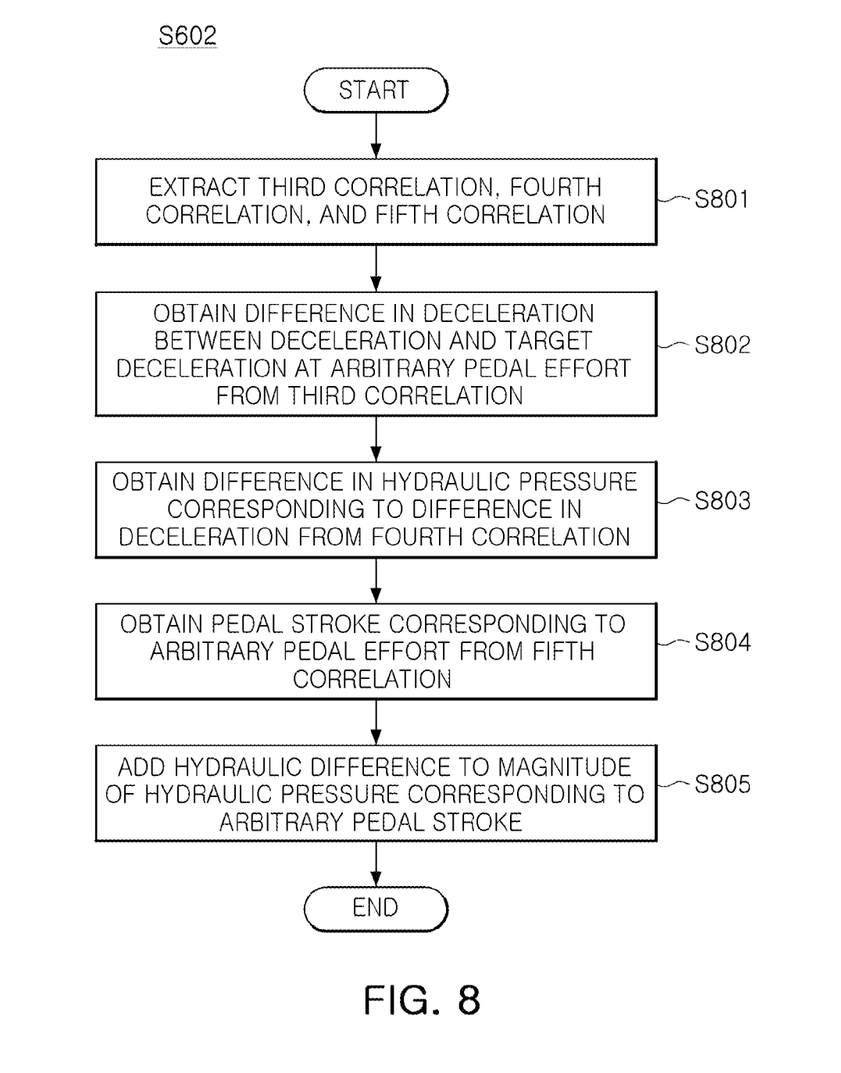
FIG. 8 is a flowchart for illustrating a method for embodying step S602 of FIG. 6 according to the second exemplary embodiment of the present disclosure.

FIG. 6 is a flowchart illustrating a method for updating a pre-stored setting value for controlling boost power of an electric booster according to an exemplary embodiment of the present disclosure. FIG. 7 is a flowchart illustrating a method for embodying step S602 of FIG. 6 according to a first exemplary embodiment of the present disclosure, and FIG. 8 is a flowchart illustrating a method for embodying step S602 of FIG. 6 according to a second exemplary embodiment of the present disclosure.

Hereinafter, a method for updating a pre-stored setting value for controlling boost power of an electric booster according to an exemplary embodiment of the present disclosure will be described with reference to FIG. 1, FIG. 2A and FIG. 2B, FIG. 3A and FIG. 3B, FIGS. 4A to 4C, FIGS. 5A to 5C, FIG. 6, FIG. 7, and FIG. 8 (S600). However, overlapping descriptions with those of FIG. 1, FIG. 2A and FIG. 2B, FIG. 3A and FIG. 3B, FIGS. 4A to 4C, and FIG. 5C are omitted for simplicity of the present disclosure.

First, as illustrated in FIGS. 1 to 6, the method (S600) for updating a pre-stored setting value for controlling boost power of an electric booster according to an exemplary embodiment of the present disclosure may be started by a step of measuring braking characteristics in the measuring unit 111. Here, the braking characteristics may include a pedal stroke, pedal effort, deceleration, and hydraulic pressure during braking measured through a braking test of a vehicle based on the pre-stored setting value, which may be as described above.

Here, hydraulic pressure may be applied from the electric booster 1 to the braking unit 2. Furthermore, as described above, the pedal stroke may be measured by use of a pressure sensor, the deceleration may be measured by use of an acceleration sensor, and the hydraulic pressure may be measured by use of a hydraulic pressure sensor.

Next, the control unit 112 may update a pre-stored setting value so that deceleration has desired target deceleration based on the measured braking characteristics (S602).

1. First Exemplary Embodiment

Referring to FIG. 1, FIG. 2A and FIG. 2B, FIG. 3A and FIG. 3B, FIGS. 4A to 4C, and FIG. 5C and FIG. 7, the control unit 112 may extract a first correlation 201 (see (FIG. 2A) between a pedal stroke and deceleration based on braking characteristics measured by the measuring unit 111, and a second correlation 202 (see FIG. 2B) between hydraulic pressure and deceleration (S701).

According to the first correlation 201 illustrated in FIG. 2A, the pedal stroke and the deceleration may include a proportional relationship, and similarly thereto, according to the second correlation 202 illustrated in FIG. 2B, the hydraulic pressure and the deceleration may include a proportional relationship, which may be as described above.

As illustrated in FIG. 3C, the control unit 112 may obtain a difference in deceleration (ΔD) between deceleration MD and target deceleration TD at an arbitrary pedal stroke PS1 from the first correlation 201. In FIG. 3A, reference numeral 301 refers to target deceleration according to a pedal stroke, as described above.

Next, as illustrated in FIG. 3B, the control unit 112 may obtain a difference in hydraulic pressure (ΔP) corresponding to the difference in deceleration (ΔD) from the second correlation 202 (S703).

Finally, the control unit 112 may update a pre-stored setting value by adding the difference in hydraulic pressure (ΔP) to hydraulic pressure corresponding to the arbitrary pedal stroke P1 (S704).

As described above, the above-described process may be terminated by updating the pre-stored setting values for all pedal strokes.

2. Second Exemplary Embodiment

Referring to FIG. 1, FIG. 2A and FIG. 2B, FIG. 3A and FIG. 3B, FIGS. 4A to 4C, and FIG. 5C and FIG. 8, the control unit 112 may extract a third correlation 401 (see (FIG. 4A) between a pedal effort and deceleration based on braking characteristics measured by the measuring unit 111, a fourth correlation 402 (see FIG. 4B) between hydraulic pressure and deceleration, and a fifth correlation 403 (see FIG. 4C) between a pedal effort and a pedal stroke (S801).

According to the third correlation 401 illustrated in FIG. 4A, the pedal effort and deceleration may include a proportional relationship, and similarly thereto, according to the fourth correlation 402 illustrated in FIG. 4B, the hydraulic pressure and the deceleration may include a proportional relationship. Furthermore, according to the fifth correlation 403 illustrated in FIG. 4C, the pedal effort and an amount of pedal stroke may include a quadratic relationship in which a slope thereof gradually decreases, as described above.

Thereafter, as illustrated in FIG. 5A, the control unit 112 may obtain a difference in deceleration (ΔD) between deceleration MD and target deceleration TD at an arbitrary pedal effort PEI from the third correlation 401. In FIG. 5A, reference numeral 501 refers to target deceleration according to a pedal effort.

Next, as illustrated in FIG. 5B, the control unit 112 may obtain a difference in hydraulic pressure (ΔP) corresponding to the difference in deceleration (ΔD) from the fourth correlation 402 (S803).

Thereafter, as illustrated in FIG. 5C, the control unit 112 may obtain a pedal stroke PS1 corresponding to an arbitrary pedal effort PEI from the fifth correlation 403 (S804), and update a pre-stored setting value by adding the difference in hydraulic pressure (ΔP) corresponding to an amount of hydraulic pressure corresponding to the pedal stroke PS1 (S805).

As described above, the above-described process may be terminated by updating pre-stored setting values for all pedal strokes.

As described above, according to an exemplary embodiment of the present disclosure, braking characteristics may be measured through a braking test of a vehicle based on desired target deceleration, and a pre-stored setting value may be updated so that deceleration has desired target deceleration based on the measured braking characteristics, so that a time required to update a setting value may be reduced.

Figure 9:
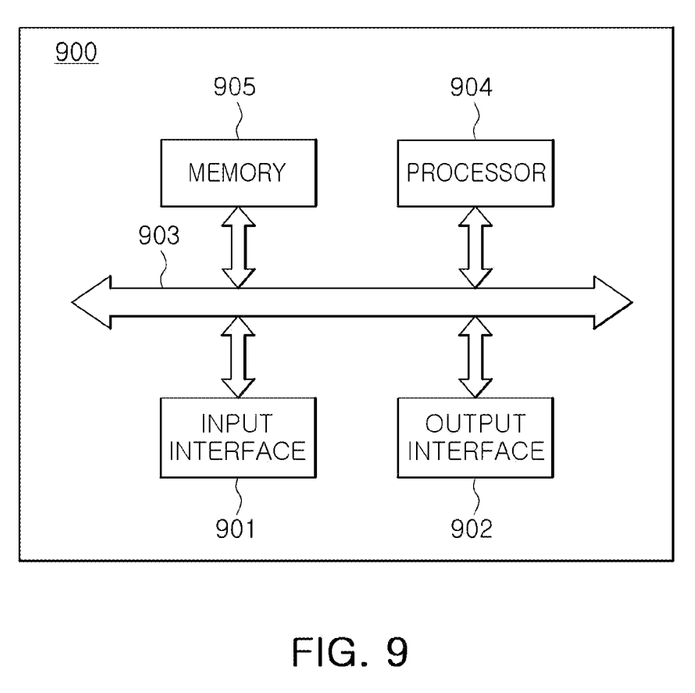
FIG. 9 is a block diagram of a computer device configured for wholly or partially implementing an apparatus for updating a pre-stored setting value for controlling boost power of an electric booster according to an exemplary embodiment of the present disclosure of the present disclosure.

Meanwhile, FIG. 9 is a block diagram of a computer device that can wholly or partially implement an apparatus 110 for updating a pre-stored setting value for controlling boost power of an electric booster, according to an exemplary embodiment of the present disclosure, which may be applied to the apparatus 110 for updating thereof illustrated in FIG. 1.

As illustrated in FIG. 9, a computer device 900 may include an input interface 901, an output interface 902, a processor 904, and a memory 905, and the input interface 901, the output interface 902, the processor 904, and the memory 905 may be interconnected via a system bus 903.

In an exemplary embodiment of the present disclosure, the memory 905 may be used to store a program, instruction or code, and the processor 904 may execute the program, instruction or code stored in the memory 905, and may receive a signal by controlling the input interface 901, and may transmit a signal by controlling the output interface 902. The above-described memory 905 may include a read-only memory and a random access memory, and may provide instructions and data to the processor 904.

In an example embodiment, the processor 904 may be implemented as a central processing unit (CPU), may be implemented as other general purpose processors, a digital signal processor (DSP), an application specific integrated circuit (ΔSIC), a field programmable gate array (FPGA) or other programmable logic devices, a discrete gate or transistor logic device, or an individual hardware component. A processor may be a microprocessor, or the processor may be any general processor, or the like. The above-described processor 904 may perform the above-described operation of the vehicle controller.

In the example embodiment, the method in FIG. 1 may be implemented by an integrated logic circuit of hardware in the processor 904 or an instruction in the form of software. The method disclosed in relation to the exemplary embodiment of the present disclosure may be implemented to be performed and completed by a hardware processor, or to be performed and completed by a combination of hardware and software modules of the processor. The software module may be stored in a storage medium such as random access memory, flash memory, read-only memory, programmable read-only memory or electrically erasable programmable memory, a register, and the like. The storage medium may be positioned in the memory 905, and the processor 904 may read information from the memory 905 and may implement the above-described method in combination with hardware. To avoid duplication, detailed descriptions thereof are omitted herein.

Meanwhile, in an exemplary embodiment of the present disclosure, '~unit' may be implemented in various manners, for example, a processor, program instructions executed by the processor, software modules, microcodes, computer program products, logic circuits, application-specific integrated circuits, firmware, and the like, or may be implemented by hardware.

As set forth above, according to an exemplary embodiment of the present disclosure, by measuring braking characteristics through a braking test of a vehicle based on a pre-stored setting value, and updating the pre-stored setting value so that deceleration has desired target deceleration based on the measured braking characteristics, an amount of time required to update the setting value may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for updating a pre-stored setting value for controlling boost power of an electric booster, the apparatus comprising:
    a control unit including a processor; and
    a storage medium recording one or more programs configured to be executable by the processor;
    a measuring unit configured for measuring braking characteristics including pedal stroke, deceleration, and hydraulic pressure applied from the electric booster to a braking unit during braking through a braking test of a vehicle, and
    wherein the control unit is configured for updating the pre-stored setting value so that the deceleration includes desired target deceleration based on the measured braking characteristics,
    wherein the pre-stored setting value is proportional to the pedal stroke, and is a value for setting a magnitude of the hydraulic pressure.

2. The apparatus of claim 1, wherein the control unit is further configured to extract a first correlation between the pedal stroke and the deceleration and a second correlation between the hydraulic pressure and the deceleration.

3. The apparatus of claim 2, wherein the control unit is further configured to update the pre-stored setting value based on the first correlation and the second correlation.

4. The apparatus of claim 2,
    wherein the control unit is further configured to obtain a difference in deceleration between deceleration and target deceleration at an arbitrary pedal stroke from the first correlation,
    wherein the control unit is further configured to obtain a difference in hydraulic pressure corresponding to the difference in deceleration from the second correlation, and
    wherein the control unit is further configured to update the pre-stored setting value by adding the difference in hydraulic pressure to a magnitude of hydraulic pressure corresponding to the arbitrary pedal stroke.

5. The apparatus of claim 4, wherein the control unit is further configured to update the pre-stored setting value for all pedal strokes.

6. The apparatus of claim 2,
    wherein the pedal stroke and the deceleration include a proportional relationship in the first correlation, and
    wherein the hydraulic pressure and the deceleration include a proportional relationship in the second correlation.

7. The apparatus of claim 1,
    wherein the measuring unit is further configured to measure a pedal effort during the braking through the braking test of the vehicle, and
    wherein the control unit is further configured to extract a third correlation between the pedal effect and the deceleration, a fourth correlation between the hydraulic pressure and the deceleration, and a fifth correlation between the pedal stroke and the pedal effort.

8. The apparatus of claim 7, wherein the control unit is further configured to update the pre-stored setting value based on the third correlation, the fourth correlation, and the fifth correlation.

9. The apparatus of claim 7, wherein the control unit is further configured for:
    obtaining a difference in deceleration between deceleration and target deceleration at an arbitrary pedal effort from the third correlation,
    obtaining a difference in hydraulic pressure corresponding to the difference in deceleration from the fourth correlation,
    obtaining a pedal stroke corresponding to the arbitrary pedal effort from the fifth correlation; and
    updating the pre-stored setting value by adding the difference in hydraulic pressure to a magnitude of hydraulic pressure corresponding to the pedal stroke.

10. The apparatus of claim 9, wherein the control unit is further configured to update the pre-stored setting value for all pedal strokes.

11. The apparatus of claim 7,
    wherein the pedal effort and the deceleration include a proportional relationship in the third correlation,
    wherein the hydraulic pressure and the deceleration include a proportional relationship in the fourth correlation, and
    wherein the pedal effort and the pedal stroke include a quadratic function relationship in which a slope thereof decreases in the fifth correlation.

12. A method for updating a pre-stored setting value for controlling boost power of an electric booster, the method comprising:
    measuring braking characteristics including pedal stroke, deceleration, and hydraulic pressure applied from the electric booster to a braking unit during braking through a braking test of a vehicle; and
    updating the pre-stored setting value so that the deceleration includes desired target deceleration based on the measured braking characteristics,
    wherein the pre-stored setting value is proportional to the pedal stroke, and is a value for setting a magnitude of the hydraulic pressure.

13. The method of claim 12, wherein the updating includes extracting a first correlation between the pedal stroke and the deceleration and a second correlation between the hydraulic pressure and the deceleration.

14. The method of claim 13, wherein the updating further includes:
    obtaining a difference in deceleration between deceleration and target deceleration at an arbitrary pedal stroke from the first correlation;
    obtaining a difference in hydraulic pressure corresponding to the difference in deceleration from the second correlation; and updating the pre-stored setting value by adding the difference in hydraulic pressure to a magnitude of hydraulic pressure corresponding to the arbitrary pedal stroke.

15. The method of claim 14, wherein in the updating, the pre-stored setting value are updated for all pedal strokes.

16. The method of claim 13,
wherein in the first correlation, the pedal stroke and the deceleration include a proportional relationship, and
wherein in the second correlation, the hydraulic pressure and the deceleration include a proportional relationship.

17. The method of claim 12,
Wherein the measuring further includes measuring a pedal effort during the braking through the braking test of the vehicle, and
wherein the updating further includes extracting a third correlation between the pedal effort and the deceleration, a fourth correlation between the hydraulic pressure and the deceleration, and a fifth correlation between the pedal stroke and the pedal effort.

18. The method of claim 17, wherein the updating further includes:

obtaining a difference in deceleration between deceleration and target deceleration at an arbitrary pedal effort from the third correlation;
obtaining a difference in hydraulic pressure corresponding to the difference in deceleration from the fourth correlation;
obtaining a pedal stroke corresponding to the arbitrary pedal effort from the fifth correlation; and
updating the pre-stored setting value by adding the difference in hydraulic pressure to a magnitude of hydraulic pressure corresponding to the pedal stroke.

19. The method of claim 17,
wherein in the third correlation, the pedal effort and the deceleration include a proportional relationship,
wherein in the fourth correlation, the hydraulic pressure and the deceleration include a proportional relationship, and
wherein in the fifth correlation, the pedal effort and the pedal stroke include a quadratic function relationship in which a slope thereof decreases.

20. A computer-readable storage medium in which a program for executing the method of claim 12 on a computer is recorded.

* * * * *